United States Patent Office 2,874,655
Patented Feb. 24, 1959

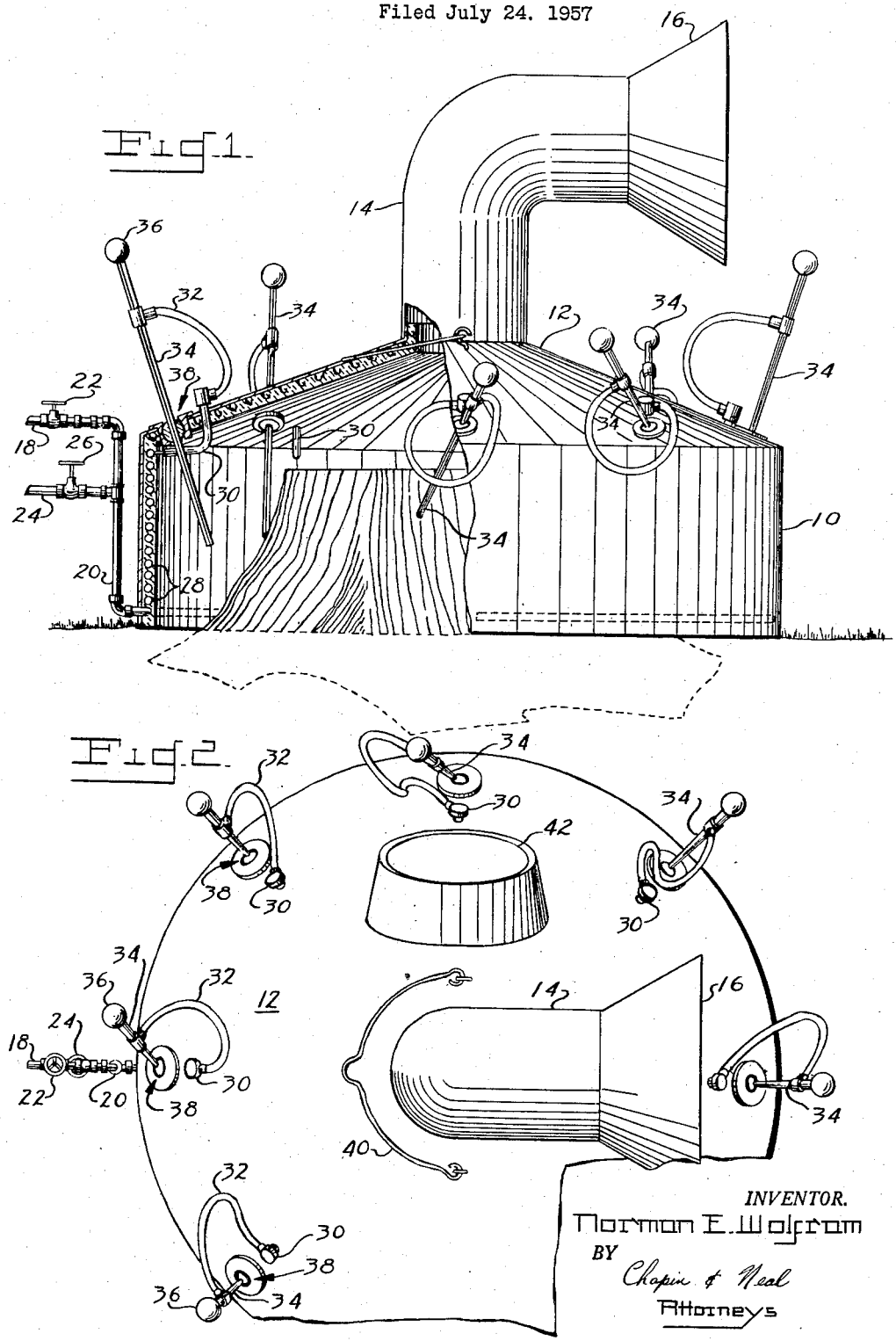

2,874,655
METHOD AND APPARATUS FOR REMOVAL OF TREE STUMPS

Norman E. Wolfram, South Deerfield, Mass.

Application July 24, 1957, Serial No. 673,932

5 Claims. (Cl. 110—21)

The present invention relates to the disposal of tree stumps.

After a tree has been felled, the task of removing or otherwise disposing of the stump, often times involves considerably more work and expense than was needed to cut down the tree itself. Many different approaches to the problem have been made in the past such as dynamiting the stump loose where there is no danger of injuring nearby buildings and the like. Others have laboriously dug away the roots and chopped them free so that the stump might be hauled away. Still others have built fires around the stumps which may smolder for days before leveling the stump to the ground. So involved is the problem of stump removal that often the stump is simply left in the ground and nature is allowed to take its course and the stump left to slowly rot away in time.

With this in mind the object of my invention is to provide improved methods and apparatus for removing tree stumps in an inexpensive and relatively rapid fashion.

A further object of the invention is to provide improved methods and apparatus for removing tree stumps with a minimum of destruction or upheaval of the area surrounding the stump and at the same time destroying the root system of the stump to a considerable distance below the surface of the ground.

The manner in which these ends are attained is characterized by the provision of a vented enclosure and placing it on top of a stump. After a fire has been kindled on or adjacent such stump, means are provided for directing pressurized air and/or oxygen at the fire to rapidly increase its rate of combustion within the vented enclosure. The controlled burning conditions thus attained expeditiously facilitate complete burning of the stump and a large portion of its root system in a relatively short period of time.

The above and other related objects as well as the various features of the invention will be apparent from the following description of the structure disclosed in the accompanying drawing and the novelty thereof pointed out in the appended claims.

In the drawings:

Fig. 1 is a side elevation, partly in section of my improved stump burning apparatus; and Fig. 2 is a plan view, with certain portions broken away, of the apparatus seen in Fig. 1.

The apparatus of the present invention comprises a hood-like enclosure which may be formed of a lower cylindrical portion 10 and a top frusto-conical portion 12 (Fig. 1). This hood-like enclosure may be placed over a tree stump after the fashion illustrated in Fig. 1. It will be seen that the enclosure is vented at the upper end of its top portion 12 by way of an elbow pipe 14 terminating in an outwardly flared portion 16. This flared portion may be directed down wind when a fire is kindled within said hood-like enclosure to prevent back or down drafts.

A fire may be kindled adjacent to or on the tree stump either before or after the hood-like enclosure has been placed over it. This fire is then intensified by the mechanism to be described below. In building up the fire it is a major purpose to first generate a hot blaze within the enclosure and then to further intensify the heat and consumption of the stump preferably by directing a plurality of jets of air under pressure to creat a swirling action within the hood during which bits of charred wood are burned in suspension while generating a still greater heat.

Connection is made with a source of pressurized air by way of a pipe 18 (Fig. 1) with the amount of air admitted to a vertical pipe 20 being controlled by a valve 22. A pipe 24 is connected to a source of pure oxygen under pressure and flow therefrom to the pipe 20 is controlled by a valve 26. Thus either pressurized air or oxygen or both may be introduced into the pipe 20.

The pipe 20 connects with a coiled pipe 28 within the cylindrical portion 10 and at the lower end thereof. Preferably the portion 10 comprises an outer steel member with refractory material lining its inner surface. It will be seen that the coiled pipe 28 extends, in convoluted fashion, from the lower end of the cylindrical portion 10 to its upper end. A plurality of pipes 30 connect with the upper end section of the coiled pipe 28 and extend through the outer surface of the upper portion 12 of said enclosure. This upper portion 12 is of the same construction as the portion 10.

At the upper end of each pipe 30 communication is made with a flexible hose 32 which in turn connects with a nozzle or jet pipe 34. The upper ends of jets 34 are closed off and provided with hand knobs 36 to facilitate manipulation as will be described. The lower ends of jets 34 extend within the hood-like enclosure and the outlets thereof are directed into the surrounding area closely adjacent the tree stump and thus gases under pressure may be fed against the stump. The jets 34 are preferably slidably mounted in pivotal ball joints as at 38 so that the outlets thereof may be spot-concentrated over a relatively wide area. The frictional forces are such that the jets 34 will remain in any given position to which they are manually adjusted.

It will also be seen that the upper enclosure portion 12 is provided with a bail 40 to facilitate its placement over the tree stump.

As above noted a fire may be kindled on or adjacent the tree stump and within the enclosure illustrated in Fig. 1. Preferably pure oxygen is first admitted to the pipe 20 by opening valve 26. In doing this it is necessary only to start a very small fire, and then as oxygen is directed into the zone of the fire by one or more of the jets 34 combustion will be quickly intensified. From a practical standpoint, the supply of oxygen may be limited to that delivered by a standard 100 cubic foot pressure tank, since it will generally be sufficient to produce an extremely hot fire on the stump. As the burning progresses and is intensified, heat will be absorbed by the cylindrical portion 10 and transmitted to the gases flowing through the coiled pipe 28. Thus after the fire is sufficiently intense, the valve 22 may be opened to admit normal air under pressure to the coiled pipe 28 and the oxygen supply valve 26 may be throttled down or entirely cut off. The air will be pre-heated before delivery from the nozzle pipes 34 toward the blazing stump. This preheated air will maintain the efficiency and intensity of the fire to a degree more than sufficient to quickly burn the stump and its associated root structure well below the level of the ground.

As burning progresses it may be necessary or desirable from time to time to shift the direction of one or more of the jets of air from pipes 34 in order to direct the gases most effectively. The jets 34 are adjustably mounted, as above described, and their positioning may be facilitated by a viewing window 42 provided in the upper enclosure wall 12 (Fig. 2). It has been found extremely effective in using this apparatus to feed high pressure air on the order to 80 to 120 lbs. p. s. i. to the system. In doing this it has also been found possible, as combustion is intensified, to direct a jet stream of preheated air or oxygen against various portions of the stump and to cut into the wood so as to increase the progressive removal thereof and assist further combustion.

It will be understood that air alone could be used with the present apparatus, the only difference being that the fire is slower to intensify than when concentrated oxygen is first used.

Having thus described my invention, what I claim as novel and desire to secure by Letters Patent of the United States is:

1. A stump burner comprising a hood-like enclosure having a cylindrical side wall and a frusto-conical top wall with a central vent opening at the top thereof, said walls being lined with refractory material and the side wall having a coiled conduit embedded in said refractory material, an inlet connection at the bottom of said coil for passage of pressurized air to the coil and a plurality of outlet connectors at the top thereof, nozzle outlets respectively joined to the connectors and mounted on said top wall at angularly spaced intervals, said nozzle outlets being directed into the interior of said hood and having swivel supporting means in which said outlets are slidably carried for angularly changing the direction of air blast therefrom.

2. A stump burner as in claim 1 wherein flexible hoses join the connectors to the respective nozzles.

3. A stump burner as in claim 1 wherein a window opening is provided in said frusto-conical top wall for observing said blasts of air to facilitate positioning of said nozzles.

4. A stump burner as in claim 1 wherein valve means are provided for regulating the flow of pressurized air to said coil and wherein is also provided a source of concentrated oxygen connecting with said coil and valve means for controlling flow of oxygen thereto.

5. A stump burner comprising a hood-like enclosure having top and side walls with a vent in the top wall, a conduit embedded in said side walls, an inlet connection to the conduit and a plurality of outlets upwardly of the inlet, connectors affixed to said outlets and discharge nozzle members joined to said connectors, said connectors being disposed at spaced locations about the enclosure with said nozzles being directed into the interior of said hood and having supporting means in a wall of said enclosure walls, said nozzle members being slidably and angularly movable for changing the direction of discharge thereof, said inlet connection, conduit and connectors providing a passage for pressurized air to said nozzles for selectively directing blasts of air from the latter at various angles into the interior of said enclosure.

References Cited in the file of this patent

UNITED STATES PATENTS

| | | |
|---|---|---|
| 191,530 | Hornbostel | June 5, 1877 |
| 1,066,535 | Ross | July 8, 1913 |
| 1,153,610 | De Lamater | Sept. 14, 1915 |
| 1,347,054 | Paxton | July 20, 1920 |
| 2,700,349 | Tubbs | Jan. 25, 1955 |
| 2,764,109 | Grosse | Sept. 25, 1956 |